US006880079B2

(12) United States Patent
Kefford et al.

(10) Patent No.: US 6,880,079 B2
(45) Date of Patent: Apr. 12, 2005

(54) METHODS AND SYSTEMS FOR SECURE TRANSMISSION OF INFORMATION USING A MOBILE DEVICE

(75) Inventors: Mark Gregory Kefford, The Gap Queensland (AU); Alain Marie Eric Vanderstraeten, Kortrijk (BE); Mario Raymond Louis Houthooft, Melle (BE)

(73) Assignee: Vasco Data Security, Inc., Oakbrook Terrace, IL (US)

(*) Notice: Subject to any disclaimer, the term of this patent is extended or adjusted under 35 U.S.C. 154(b) by 45 days.

(21) Appl. No.: 10/132,048

(22) Filed: Apr. 25, 2002

(65) Prior Publication Data

US 2003/0204726 A1 Oct. 30, 2003

(51) Int. Cl.[7] .............................................. H04L 9/00
(52) U.S. Cl. ...................................... 713/155; 713/171
(58) Field of Search ................................. 713/155, 168

(56) References Cited

U.S. PATENT DOCUMENTS

| | | | |
|---|---|---|---|
| 4,599,489 A | 7/1986 | Cargile | 178/22.08 |
| 4,609,777 A | 9/1986 | Cargile | 178/22.08 |
| 4,819,267 A | 4/1989 | Cargile et al. | 380/23 |
| 5,732,137 A | 3/1998 | Aziz | 380/25 |
| 5,745,571 A * | 4/1998 | Zuk | 380/285 |
| 5,946,629 A | 8/1999 | Sawyer et al. | 455/466 |
| 6,253,326 B1 | 6/2001 | Lincke et al. | 713/201 |
| 6,363,478 B1 | 3/2002 | Lambert et al. | 713/151 |

OTHER PUBLICATIONS

Secure Computing Corporation, "Announcing Mobile-Pass—the wireless authentication solution that sends one time passwords to your mobile device!" http://www.secure-computing.com/printerfriendly.cfm?skey=970, Apr. 17, 2002.*

Secure Computing Corporation, "Secure Computing Announces the First Zero–Footprint Strong Authentication Solution Using Wireless Devices" Gomez, http://www.securecomputing.com/archive/press/2002/feb19,02.htm Feb. 19, 2002.*

U.S. Appl. No. 09/500,553, Haggard et al., filed Feb. 9, 2002.

U.S. Appl. No. 09/789,197, Hoornaert et al., filed Feb. 20, 2001.

U.S. Appl. No. 10/135,163, Coulier, filed Apr. 30, 2002.

"Secure and Mobile Digital Signatures for Internet Banking," date unknown, but prior to Apr. 25, 2002.

DynaPass®, "Wireless Secure Access," Apr. System Design, http://www.april.se/english/dynapass.asp, Apr. 16, 2002 with attached printer friendly version printed Aug. 28, 2002.

(Continued)

*Primary Examiner*—Gregory Morse
*Assistant Examiner*—Christopher J Brown
(74) *Attorney, Agent, or Firm*—Fliesler Meyer LLP

(57) ABSTRACT

Methods and systems for secure transmission of information are provided. In accordance with a method of the present invention, a client sends to a server, a request, at least one unique identifier and an encryption key. The server generates a reply to the request and identifies a mobile device (based on the at least one unique identifier) to which to send the reply. The server also encrypts the reply, using the encryption key, to thereby produce an encrypted reply. The encrypted reply is then sent from the server to the mobile device (e.g., a mobile phone). Once received by the mobile device, the encrypted reply is available for transfer (automatically or manually) from the mobile device to the client. Once provided to the client, the client can decrypt the encrypted reply using the encryption key. The decrypted reply is then available for use at (e.g., by) the client.

48 Claims, 7 Drawing Sheets

OTHER PUBLICATIONS

Secure Computing Corporation, "Announcing Mobile-Pass™ —the wireless authentication solution that sends one–time passwords to your mobile device!" http://www.securecomputing.com/printerfriendly.cfm?skey=970, Apr. 17, 2002.

www.signify.net 8 pages; includes: Signify Solutions Ltd., "SecurID from Signify," http://www.signify.net/signifyweb/ . . . /a2129bac665c74f 980256a7300510587?OpenDocument, Apr. 24, 2002. Signify Solutions Ltd., "Signify Digital Signatures," http://www.signify.net/signifyweb/ . . . 1c6f44e9ee0815b180256ab0003d6982?OpenDocument, Apr. 24, 2002. Signify Solutions Ltd., "The Signify Service Portfolio," http://www.signify.net/signifyweb/main.nsf/pages/the–signify–service–portfolio?opendocument, Apr. 24, 2002. Signify Solutions Ltd., "SMS Passcode Service," http://www.signify.net/signifyweb/ . . . /eca6ff20edf8b92 880256ab000602e92?OpenDocument, Apr. 24, 2002. Signify Solutions Ltd., "Welcome to Signify, The Internet Authentication Service," http://www.signify.net, Apr. 24, 2002.

Utimaco® Safeware AG, "Authentication procedure using mobile phone," http://194.245.91.191/eng/content_sp/mobileauthserver.html, Apr. 24, 2002.

Utimaco® Safeware AG, "Secure one–time passwords via your mobile phone," http://www.utimaco.de/eng/pocket_pc/p010720.html, Apr. 24, 2002.

* cited by examiner

| user ID | PIN | Mobile Identifier |
|---|---|---|
| user ID $_1$ | PIN $_1$ | telephone number$_1$ |
| user ID $_2$ | PIN $_2$ | ESN $_2$ |
| user ID $_3$ | PIN $_3$ | ESN $_3$ |
| user ID $_4$ | PIN $_4$ | MAN $_4$ |

FIG. - 3

METHODS AND SYSTEMS FOR SECURE TRANSMISSION OF INFORMATION USING A MOBILE DEVICE

BACKGROUND OF THE INVENTION

1. Field of the Invention

The present invention relates to methods and devices for secure transmission of information using a standard mobile device, such as a mobile phone.

2. Description of the Related Art

The number and variety of computer-based services that can be accessed remotely, either by means of public access channels such as the Internet or telephone networks, or through media such as interactive TV continues to grow exponentially. As many of these services are financial in nature or are otherwise sensitive as to who gets access to what information, there is a great demand for authenticating the identity of someone before granting that person access to potentially sensitive information. All authentication methods can be reduced to a combination of providing proof of something a user knows, has (e.g., owns), or is.

For example, a popular method to authenticate people is the "username-password" method. This method requires that people have to claim their identity, and then have to provide a secret password to prove that identity. Clearly, this method is of the type of "proving something you know". While very simple to implement, this method has serious security concerns. As most people are not very good at memorizing secret passwords, they tend to either choose easy to remember passwords, or to write the passwords down. In both cases the security of the username-password method is considerably compromised.

An alternative to the 'something you know' method is the 'something you have' method. Instead of proving the user's identity by proving that they know some secret, the user must prove that they are in possession of some physical personalized object, e.g. a computer-based key device (also known as a token) or smart card. In essence this is the same concept as being able to enter a building because you possess the key to the door. Unfortunately, physical objects can be lost or stolen.

To attain a higher level of security, one can combine the "something you know" and the 'something you have' methods. In this scenario, in order to prove their identity the user must prove both that they know some secret, and that they possess some specific object. An example is a smart card that can only be used after the user has presented a secret personal identification number (PIN). Another example are the so-called strong authentication tokens that generate one-time passwords. In their most common form these strong authentication tokens are small handheld battery-powered devices with a display and a keyboard that look much like pocket calculators. Examples of such devices are the Digipass™ devices and related technologies from Vasco Data Security, Inc., which are described in further detail in the following applications and patents, each of which is incorporated herein by reference in its entirety: U.S. Provisional Patent Application 60/287,858, entitled "Use And Generation of a Session Key in a Secure Socket Layer Connection", filed on May 1, 2001; U.S. patent application Ser. No. 09/500,533, entitled "Security Access and Authentication Token With a Private Key Transport Functionality", filed on Feb. 9, 2000; U.S. patent application Ser. No. 09/789,197, entitled "Field Programmable Smart Card Terminal and Token Device", filed on Feb. 20, 2001; U.S. Pat. No. 4,599,489, entitled "Solid state key for controlling access to computer software"; U.S. Pat. No. 4,609,777, entitled "Solid state key for controlling access to computer software"; and U.S. Pat. No. 4,819,267, entitled "Solid state key for controlling access to computer systems and to computer software and/or for secure communications". When using such a device, after the user has entered their secret PIN, the strong authentication token calculates a dynamic value. The calculation of this value is based on a secret that is unique for each token instance and input value. This input value can, for example, be a challenge that is entered by the user, or in other instances a time value provided by the token device's internal clock or both. The dynamic value (or one-time password) can then be used to prove to a server that one is in possession of the token device, and that one knows the PIN for that token device.

Tokens and smart cards offer a robust solution for many security-conscious organizations. But the cost of purchasing and deploying tokens (as well as software tokens, digital certificates, or smart cards) can limit their accessibility, and does require additional expenditures. Accordingly, there is a need to provide for secure transmission of information without having to deploy security specific devices to end users.

Systems are now available that generate and transmit a one-time password directly to a mobile phone or other mobile device. The one-time password appears as a text message or e-mail on the mobile device. After being viewed on a display of the mobile device, the one-time password is then entered into a PC or laptop (by an end user) to gain supposedly secure access to private information. The above procedure offers the security for user authentication according to an ownership (what a user has) principle. The widespread use of mobile telephones also means that this procedure may be less expensive than procedures with comparable security which require additional hardware, such as smart cards or tokens. However, a problem with the above described system is that the transmission of the one-time password is not encrypted, and thus passwords can be easily sniffed or hacked by an untrusted third party. Further, if a mobile device is lost or stolen, an untrusted third party may be able to obtain one-time passwords and then gain access to private information of the mobile phone's true owner.

Other systems use mobile phones to offer the functionality of authentication tokens either through the use of embedded software, or through a software application residing on a Subscriber Identity Module (SIM) card, thus taking advantage of the fact that a mobile phone is a personal device that people carry around all the time and that is already (typically) equipped with a display and a keyboard. Each SIM card is programmed with specific identification features for a unique user, allowing the mobile phone that contains a SIM to be used for such things as online banking and purchasing that require a secure means of identification. Each SIM card may also be programmed with a private key. A one-time password can then be sent to the mobile phone either as a clear text or encrypted (public key procedure) message. If the one-time password is encrypted, then the SIM card (or embedded software) includes the private key that can be used to decrypt the message. Accordingly, related keys must be stored in a database (public key) and on the SIM card (or embedded software) in the mobile phone (private key). A significant disadvantage of the above described system which relies on SIM cards is that it can only be used with mobile phones that can accept and read SIM cards. Even if the software were embedded in mobile phones (rather than residing on SIM cards), only mobile phones having the application specific software (including a private key) could be used with the system. Stated another way, already deployed mobile phones and new mobile phones not including the appropriate embedded software would not be usable with the above described system.

What is needed are methods and systems that overcome some, and preferably all, of the above described disadvantages. More specifically, there is the need for methods and systems that provide for secure transmission of information (e.g., a one-time password) by taking advantage of mobile devices (e.g., mobile phones) that people carry around all of the time. Preferably, such methods and systems should be useable with already deployed mobile devices. Stated another way, it is preferably that such methods and system do not require any modification or customization of existing or future mobile devices. Preferably, the transmissions should be secure such that an untrusted third party can not sniff or hack the transmission. Further, if an untrusted third party finds or steals a mobile device, the methods and systems should be such that the untrusted third party can not gain access to private information of the mobile device's true owner.

BRIEF SUMMARY OF THE INVENTION

The present invention provides methods and systems that use mobile devices to secure the transmission of information. In accordance with an embodiment of the present invention, a client sends to a server, a request, at least one unique identifier and an encryption key. The encryption key is preferably en a single use key generated by the client. Secure Socket Layer (SSL) and/or other security protocol(s) is preferably used for this transfer. The request can be, for example, a request for information, a request for access, a request for a one-time password or a request for a digital signature.

The server generates a reply to the request and identifies a mobile device (based on the at least one unique identifier) to which to send the reply. The server also encrypts the reply, using the encryption key, to thereby produce an encrypted reply. The encrypted reply is then sent from the server to the identified mobile device (e.g., a mobile phone). If the encrypted reply is intercepted by an untrusted third party, the reply is useless because it is encrypted. Once received by the mobile device, the encrypted reply is available for transfer (automatically or manually) from the mobile device to the client (that sent the request).

Once provided to (e.g., entered into or transmitted to) the client, the client can decrypt the encrypted reply using the encryption key. The decrypted reply is then available for use at (e.g., by) the client. If the encrypted reply is provided to any other client (i.e., other than the client that sent the request), the encrypted reply is useless because only the original client (that sent the request) has access to the encryption key necessary to decrypt the encrypted reply.

In an embodiment of the present invention, the encrypted reply is displayed on a display of the mobile device. Then an end user can provide the encrypted reply to the client by entering (e.g., typing or keying) the encrypted password into the client.

In another embodiment of the present invention, the encrypted reply is transmitted from the mobile device to the client, for example, using BlueTooth™ or infrared.

In accordance with another embodiment of the present invention, a client sends a request for information to an information server. The client also sends an authentication request, at least one unique identifier and an encryption key to an authentication server. An authentication reply is then generated at the authentication server. The authentication reply is encrypted using the encryption key to thereby produce an encrypted authentication reply, which is then sent from the authentication server to the identified mobile device. The authentication server also identifies a mobile device to which to send the authentication reply, based on the at least one unique identifier. Once received at the mobile device, the encrypted authentication reply can be provided to the client. After being transferred from the mobile device to the client, the encrypted authentication reply is decrypted using the encryption key.

The client then sends the decrypted authentication reply to the information server along with the at least one unique identifier. The information server then checks to make sure that the end user is who he says he is. This is accomplished by sending, from the information server to the authentication server, the decrypted authentication reply and the at least one unique identifier. The authentication server then determines an authentication result (e.g., success or failure). This authentication result is sent from the authentication server to the information server. The information server then produces an information reply (to the information request), in response to receiving the authentication result. This information reply is then sent from the information server to the client. If the authentication result was negative, the information reply may state that authentication was denied, and thus, that the requested information will not be provided. If the authentication result was positive, then the information reply may contain the information that was originally requested.

The features, aspects, and advantages of the present invention will become more apparent from the detailed description set forth below, the drawings and the claims.

BRIEF DESCRIPTION OF THE DRAWINGS/ FIGURES

FIG. 3 is an example of a table that associates user IDs and PINs with mobile devices, in accordance with an embodiment of the present invention;

DETAILED DESCRIPTION OF THE INVENTION

Figure 1:
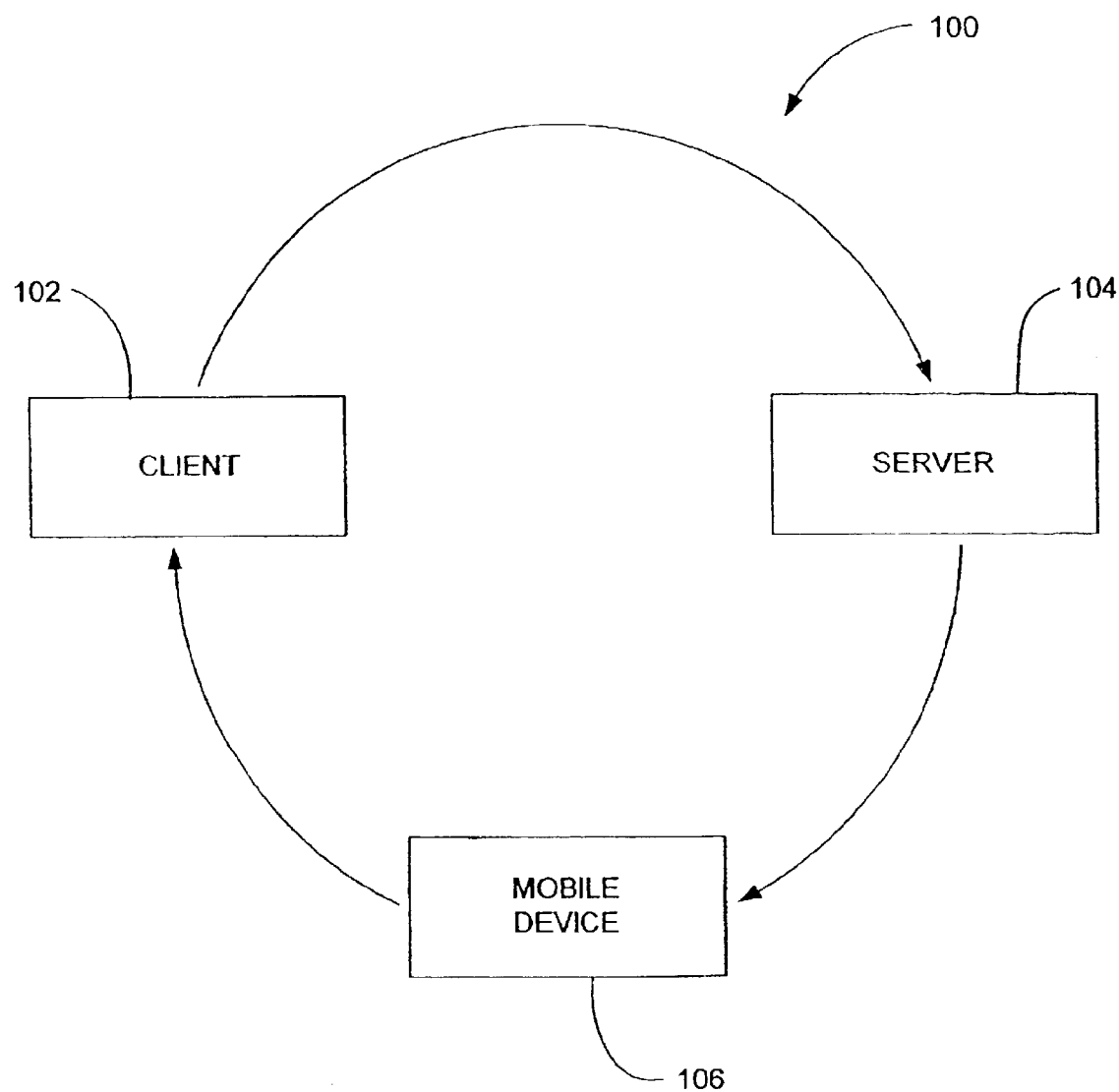
FIG. 1 is a high level block diagram of an environment of an embodiment of the present invention.

FIG. 1 is a high level block diagram of an environment 100 of an embodiment of the present invention. Environment 100 includes a client 102, a server 104 and a mobile device 106. Such elements of environment 100 can make up a system or subsystem of the present invention. Client 102 is a device or system (e.g., a desktop or hand held computer) used by an end user (e.g., a person) to make a query (also referred to as a request). Server 104 is a computer that is capable of supplying information in response to a query, and/or performs intermediary tasks between a client (e.g., client 102) and another server (not shown in FIG. 1). Mobile device 106 is a wireless device that is capable of receiving wireless messages. Mobile device 106 may also be capable of displaying messages (and thus, includes a viewable display) and/or transmitting messages. Mobile device 106 can be, for example, a mobile phone, a one-way paging device, a two-way paging device, a handheld or portable computing device (e.g., a Palm™ or Handspring™ personal data assistant (PDA)), or any other wireless communications device. The end user can be, for example, a person using client 102 to attempt to access server 104 (e.g., to obtain information or authentication from server 104). Accordingly, an end user can request information from server 104 using client 102. It is assumed that the end user owns, leases, or otherwise has access to mobile device 106.

It is possible that client 102 and mobile device 106 may be the same or similar types of devices (e.g., they may both be hand held computers capable of wireless communication). However, even though they may be the same types of devices, client 102 and mobile device 106 should be separate (i.e., distinct) devices. For the following description of embodiments of the present invention, it is useful to assume that client 102 is a personal computer terminal and mobile device 106 is a mobile phone.

In response to receiving a request from client 102, server 104 can determine (e.g., generate) a reply to the request. Such a reply can be sent from server 104 back to client 102, thereby providing the end user with the reply. However, in accordance with embodiments of the present invention, security of the reply transmission is increased by sending the reply to mobile device 106, rather than directly back to client 102. To further increase security, the reply that is sent to mobile device 106 is encrypted or secure. As will be appreciated from the following discussion, it is not until the encrypted reply is provided to client 102 that the actual reply is decrypted and available to client 102 (and possibly revealed to the end user).

Figure 2:
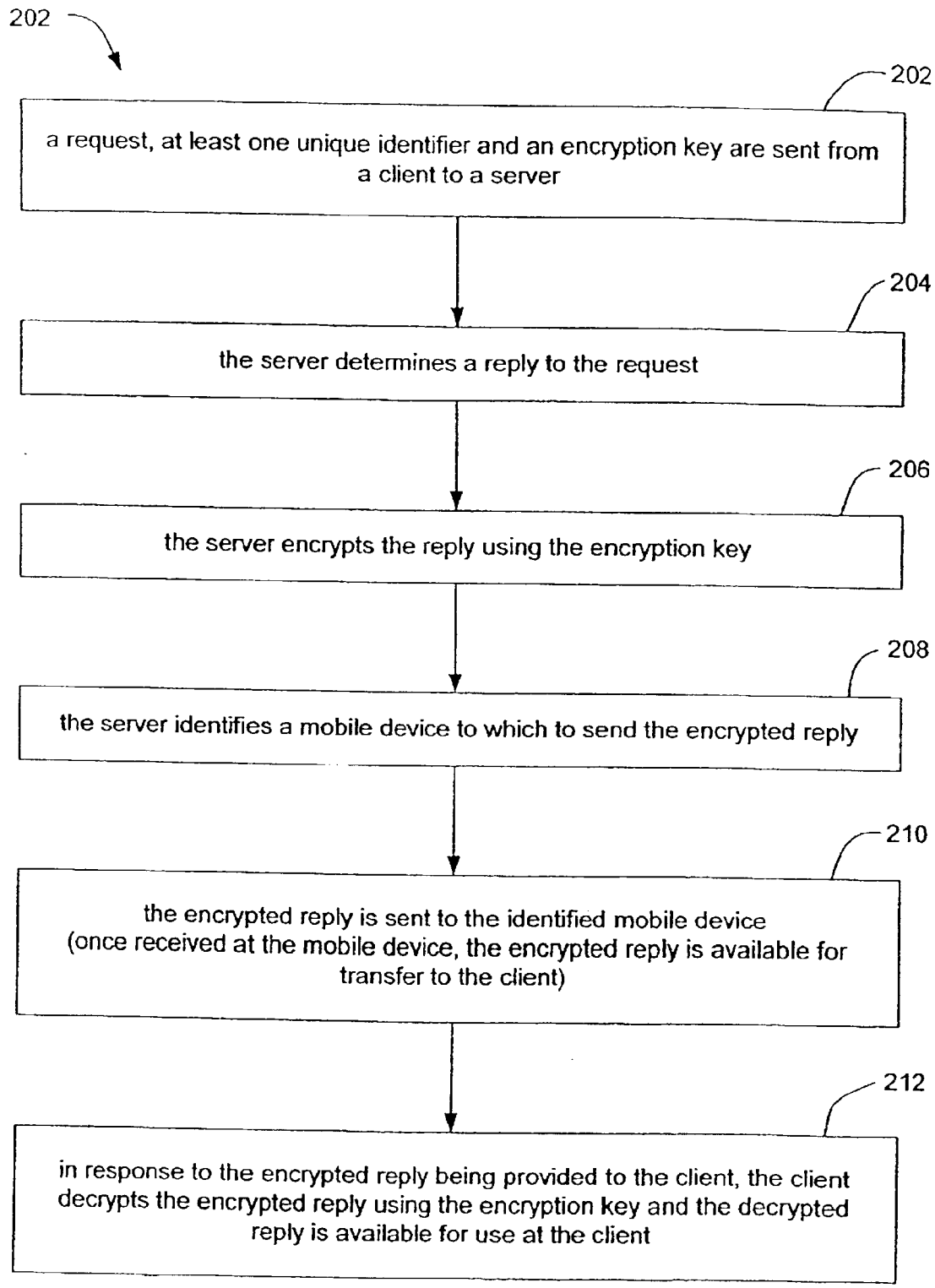
FIG. 2 is a flow diagram describing a method for providing secure transmission of information, in accordance with an embodiment of the present invention.

The flow diagram of FIG. 2 will now be used explain a method 200, in accordance with an embodiment of the present invention. Method 200 begins with client 102 sending a request, at least one unique identifier and an encryption key from client 102 to server 104, at a step 202. The sending of the request can be initiated, for example, by an end user entering the request using client 102. In a specific example, client 102 is a personal computer, the request is for the end user's bank account balance, and server 104 is a server controlled by the end user's bank. Other exemplary requests can be a request for a one-time password (OTP) or a request for a digital signature. A further exemplary request is a request for access to a web site supported by server 104 (i.e., server 104 may be a web server). These a just a few examples of requests that are not meant to be limiting. The request (plus identifier(s) and encryption key) can be sent via any communications system (or combination of systems) over which the client and the server can communicate.

Although not required, this transmission from client 102 to the server 104 is preferably secured (e.g., encrypted), for example, using Secure Socket Layer (SSL). SSL is a security protocol designed and specified by Netscape™ for providing data security layered between application protocols (such as HTTP, Telnet, NNTP, FTP etc.) and TCP/IP. SSL, which is based on public key cryptography provides data encryption, server authentication, message integrity, and option client authentication for a TCP/IP connection. Alternative or additional security protocols, such as Secure HTTP (S-HTTP), can also be used to create a secure connection between client 102 and server 104. Use of other secure communications is also within the spirit and scope of the present invention. Such security protocols are used to prevent a hacker from obtaining a copy of the encryption key, unique identifier information and/or request information.

The encryption key sent along with the request can be a static key that is stored in a memory (not shown in FIG. 1) of client 102. Preferably, however, the encryption key is dynamic in that a new key is generated by client 102 each time client 102 sends a request to server 104. In other words, the encryption keys are preferably single use keys. Generation of the encryption key can be in response to the end user initiating a request. One of ordinary skill in the art would appreciate that any one of a number of different types of algorithms can be used to generate a single use encryption key.

If encryption keys are static, server 104 can identify the correct mobile device 106 in which to send a reply based on the received key (assuming client 102 is a device primarily associated with or used by only one end user). However, if encryption keys are dynamic, as is preferably the case, information that enables server 104 to identify a specific mobile device 106 must be sent along with an encryption key and request. Such identifying information can be, for example, a user identifier (user ID), a personal identification number (PIN), a password and/or any other unique identifier(s) associated with the end user. Alternatively, this identifying information can be an identifier associated with client 102 (assuming client 102 is a device primarily associated with or used by only one end user). Example's of identifiers that can be associated with a client include, but are not limited to, IP addresses and electronic serial numbers. Each of the of the above types of identifying information is generically referred to herein as a unique identifier.

Associations between unique identifiers and mobile devices are accessible to server 104. Such associations can be lists, tables, arrays, matrices, and the like, that associate, for example, user IDs and/or PINs with mobile device identifiers. If the mobile device is a mobile phone, an associated mobile device identifier can be the telephone number usable to access that mobile phone. If the mobile device is a paging device, the mobile device identifier can be a Mobile Identification Number (MIN), an Electronic Serial Number (ESN), a Mobile Access Number (MAN), or combinations thereof. Table 300, shown in FIG. 3, is an example of a table that associates user IDs and PINs with mobile devices. Thus, in this example, it is possible that two different end users can have the same PIN (as shown in rows 308 and 310), so long as their user IDs are different. In this example, table 300 includes a PIN column 302, a user ID column 304, and a mobile identifier column 306. Mobile identifier column 306 may include telephone numbers, ESNs, and the like. It is also possible that entries in mobile identifier column 306 include further identifiers that point to entries in other tables.

Returning to the flow diagram of FIG. 2, at a step 204, server 104 determines a reply to the request. At a step 206, server 104 encrypts the reply using the encryption key that it received from client 102. Thus, an encrypted reply is produced. Server 104 then identifies a mobile device to which to send the encrypted reply, at a step 208. Server 104 identifies the mobile device based on the at least one unique identifier (some examples of which were discussed above) that was also sent with the request and encryption key.

Server 104 then sends the encrypted reply to the mobile device that was identified at step 208. Any appropriate technique can be used to send the encrypted reply to mobile device 106. Of course, the selected technique is dependent on the type of identified mobile device. For example, a wireless communications system can be used to send the encrypted reply if the identified mobile device is a mobile phone, so long as the system can support the transmission of data (e.g., text messaging, Short Message Service (SMS) messaging, email, and the like). In another example, a paging system is used if the identified mobile device is a paging device. Additional security need not be provided for the transmission from server 104 to mobile device 106 because the reply being transmitted is already encrypted.

Once received at mobile device 106, the encrypted reply is available for transfer to client 102. In one embodiment, the encrypted reply is displayed on a display of mobile device 106 (e.g., as a text type message). The end user can then provide the encrypted reply to client 102 by, for example, entering the encrypted reply using a keyboard, keypad or touch screen associated with client 102. In another embodiment, the encrypted reply is stored in mobile device 106, but not displayed on mobile device 106. In this embodiment, the encrypted reply can be transmitted from mobile device 106 to client 102 using, for example, BlueTooth™, infrared, or some other wireless communication. It is even possible that a physical (e.g., wired) connection can be set up between mobile device 106 and client 102, although this is not as practical because it would require additional hardware. Additional security need not be provided for such transmission from mobile device 106 to client 102 because the reply being transmitted is already encrypted.

At a next step 212, in response the encrypted reply being provided to client 102, client 102 decrypts the encrypted reply using the encryption key (that client 102 originally sent to server 104 at step 202). The decrypted reply is then available for use at (e.g., by) client 102. In one embodiment, the decrypted reply is displayed to the end user on a display associated with client 102. Thus, the displayed decrypted reply may provide the end user with the an answer to the end user's request. For example, if the end user wanted to know their bank account balance, the decrypted reply can be the balance. In other embodiments, the decrypted reply may be a one-time password (OTP) or a digital signature, that can be used by the end user and/or client 102 to access further information (e.g., stored on server 104 or another server). Alternatively, or additionally, the decrypted reply may be transmitted from client 102 to, for example, another server to thereby gain access to that server. In another embodiment, the decrypted reply may activate a program stored on client 102. These are just a few examples, which are not meant to be limiting, of what can be done with the decrypted reply once it is available for use at client 102.

Figure 4:
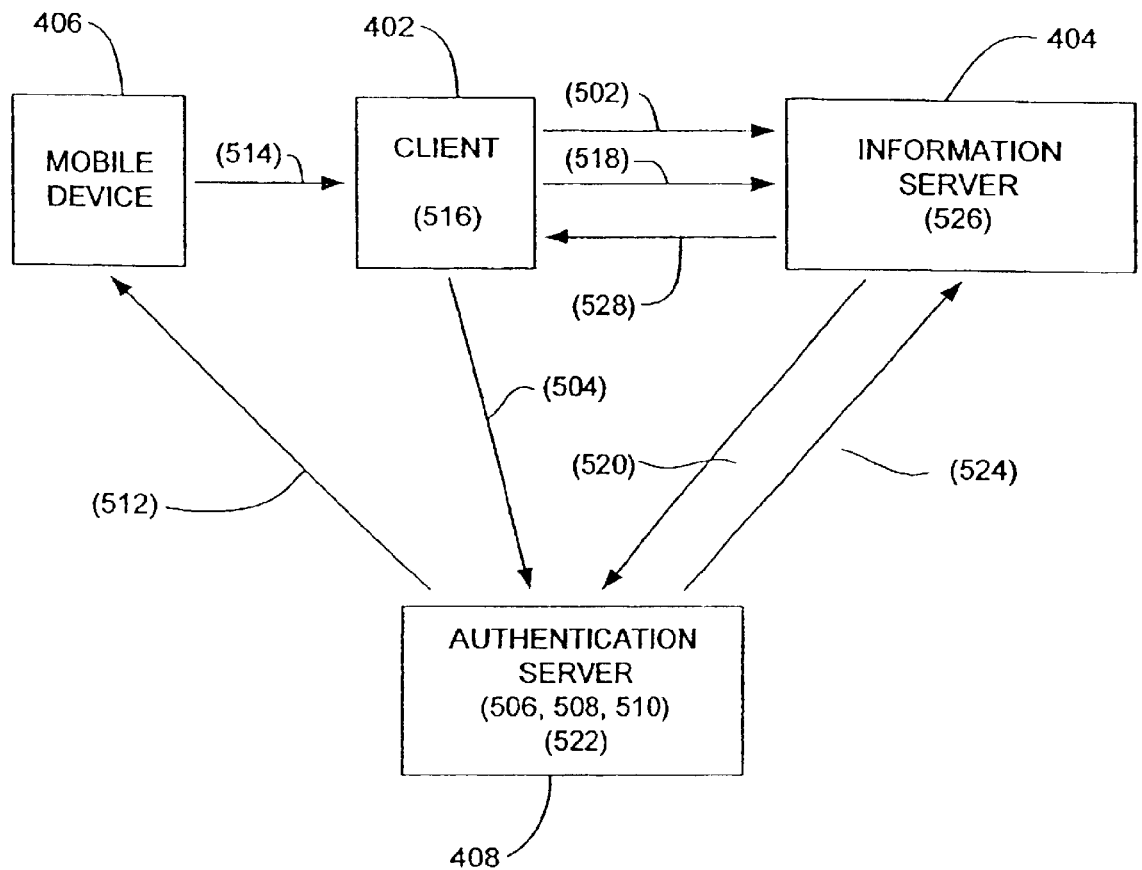
FIG. 4 is a high level block diagram showing another environment of an embodiment of the present invention.

FIG. 4 shows another environment 400 of an embodiment of the present invention. Environment 400 includes a client 402, an information server 404, an authentication server 408 and a mobile device 406. Exemplary types of clients are discussed above. Information server 404 is a computer that is capable of supplying information in response to a query, and/or performs intermediary tasks between a client (e.g., client 402) and another server. Authentication server 408 is a computer, that among other things, can be used to assess whether an end user is who he or she claims to be. The numbers within parentheses in FIG. 4 correspond to steps of a method 500 described in connection with FIGS. 5A and 5B.

It is possible that information server 404 and authentication server 408 are the same server. In such a situation, many of the steps that will be described with reference to the flow diagram in FIGS. 5A and 5B may not be necessary. However, assuming that authentication server 408 and information server 404 are distinct servers, it is likely that authentication server 408 is under the control of a trusted third party.

Figure 5A:
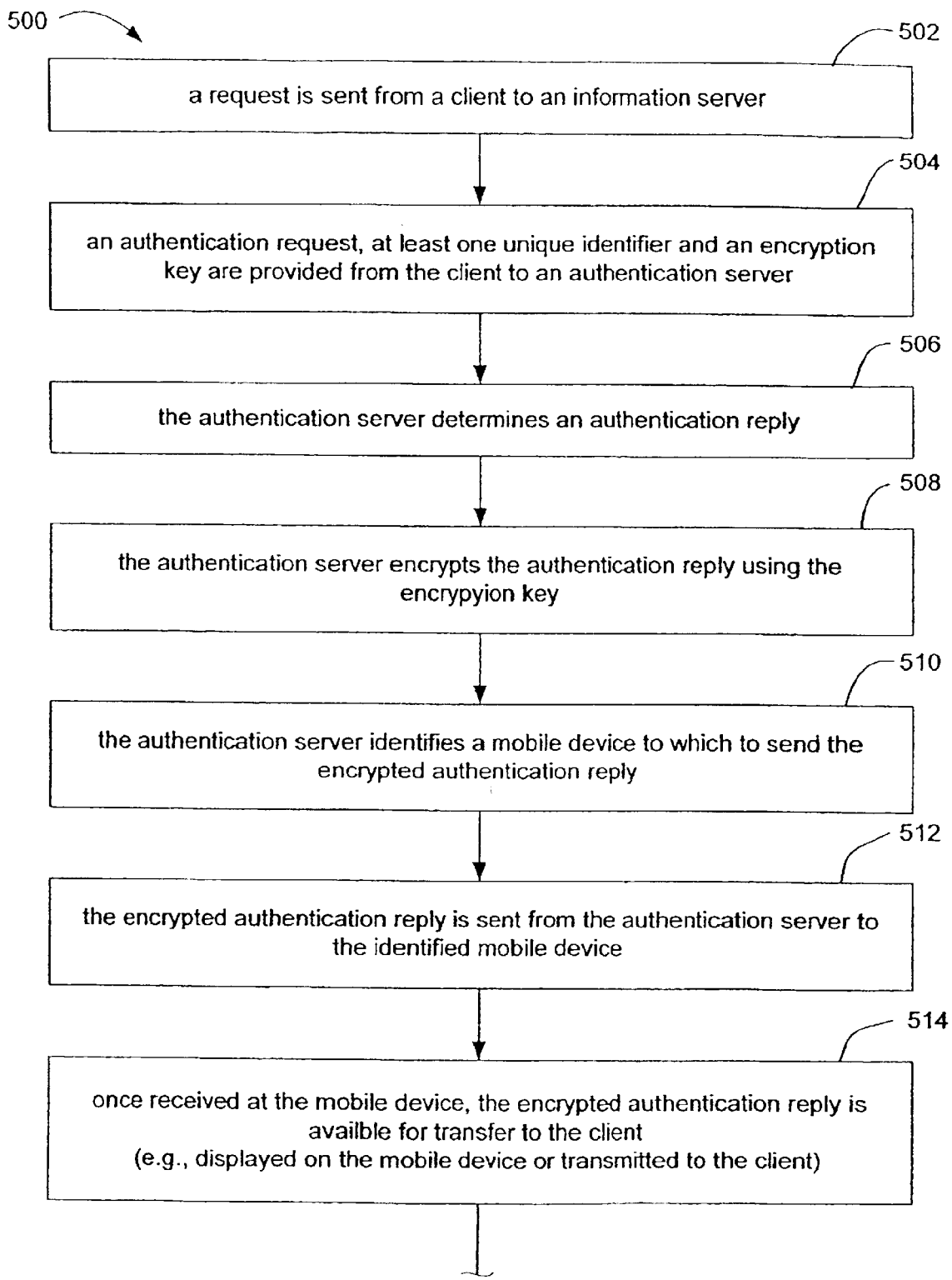
FIGS. 5A and 5B illustrate a flow diagram describing a method for providing secure transmission of information using the environment of FIG. 4.
Figure 5B:
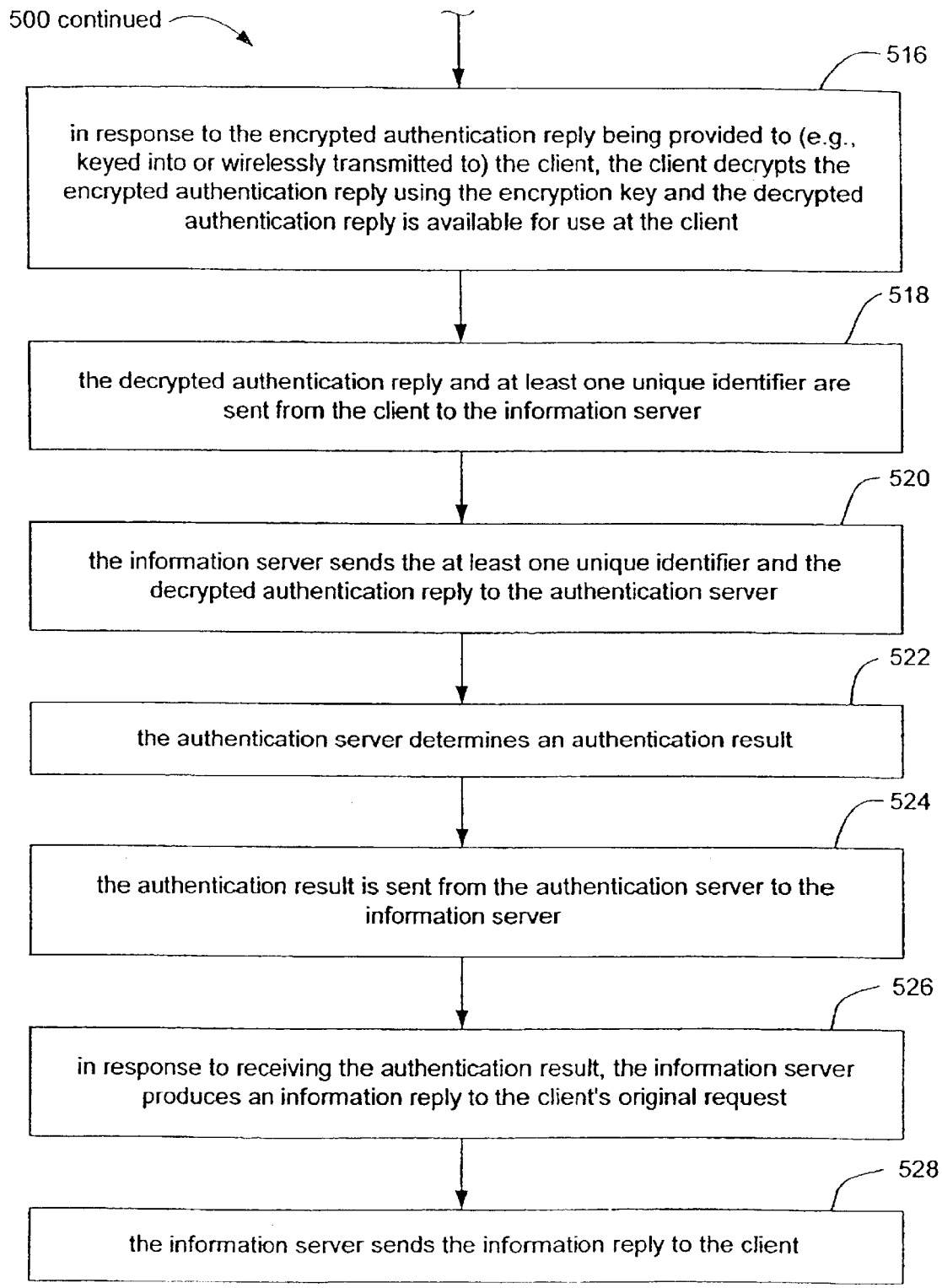

Referring now to the flow diagram of FIGS. 5A and 5B, a method 500 for use with environment 400 will now be described. At a step 502, a request is sent from a client to an information server 502. Exemplary requests are discussed above in connection with step 202 of FIG. 2. The sending of the request can be initiated, for example, by an end user that has entered the request using client 402.

At a step 504, an authentication request, at least one unique identifier and an encryption key (preferably generated by client 402) are sent from client 402 to authentication server 408. Exemplary unique identifiers are discussed above. Although not required, this transmission from client 402 to authentication server 408 is preferably secured (e.g., encrypted) using, for example, Secure Socket Layer (SSL), S-HTTP and/or other secure communications.

Client 402 may prompt the end user to enter such unique identifier(s), for example, using a keyboard, keypad, mouse or touch screen associated with client 402. In one specific embodiment, information server 404 sends a program (e.g., a Java applet) to client 402 in response to receiving the original request (at step 502) from client 402. This program, when executed on client 402, may prompt the end user to enter the one or more identifiers. In another embodiment, the program (e.g., Java applet) is already residing on client 402. Execution of the program may be initiated when the original request (at step 502) was sent to information server 404. Alternatively, information server 404 may send an initiating message back to client 402 in response to receiving the original request (at step 502).

At a step 506, after receiving the authentication request, the encryption key and the at least one unique identifier (e.g., a user ID and a PIN), authentication server 408 determines an authentication reply. This can be, for example, a one-time password (OTP) or a digital signature. At a step 508, the authentication reply is encrypted using the encryption key (provided by client 402 at step 504). This produces an encrypted authentication reply. At a step 510, authentication server 408 identifies a mobile device 406 to which to send the encrypted reply, in a manner similar to that discussed above with regards to step 208. At a step 512, the encrypted authentication reply is sent from authentication server 408 to the identified mobile device. Additional security need not be provided for such transmission from authentication server 408 to mobile device 406 because the authentication reply being transmitted is already encrypted.

Once received at mobile device 406, the encrypted authentication reply is available for transfer to client 402. In one embodiment, the encrypted reply is displayed on a display of mobile device 406 (e.g., as a text type message). The end user can then provide the encrypted reply to client 402 by, for example, entering the encrypted reply using a keyboard, keypad or touch screen associated with client 402. In another embodiment, the encrypted reply is stored in mobile device 406, but not displayed on mobile device 406. In this embodiment, the encrypted reply can be transmitted from mobile device 406 to client 402 using, for example, BlueTooth™, infrared, etc., as explained above in the discussion of step 212 of FIG. 2.

At a next step 516, in response to the encrypted authentication reply being provided to client 402, client 402 decrypts the reply using the encryption key and the decrypted authentication reply is available for use at (e.g., by) client 402. The decrypted authentication reply and the at least one unique identifier may then be sent from client 402 to information server 406, as specified at step 518. Information server 408 now checks to make sure that the end user is who he says he is. To accomplish this, at a step 520, information server 404 sends the at least one unique identifier and the decrypted authentication reply to authentication server 408. At a step 522, authentication server 408 determines an authentication result (e.g., success or failure) based on the one or more unique identifiers and the decrypted authentication reply.

Remember, authentication server 408 originally produced the authentication reply (at step 506). Authentication server 408 may have saved that authentication reply along with the one or more unique identifiers. Authentication server 408 can then compare the authentication reply received from information server 404 to the saved authentication reply to thereby determine an authentication result (e.g., success or failure) at step 522. If the saved authentication result matched the authentication result received from information server 404 (for the specific one or more unique identifiers), then the authentication result would indicate a successful result. Otherwise, the authentication result would indicate a failed result.

Alternatively, rather then saving the authentication reply (generated at step 506), authentication server 408 can regenerate one or more authentication replies (e.g., using the same algorithm used to create the original authentication result, where the algorithm relies, for example, on the one or more unique identifiers and a time factor generated by an internal clock). For example, authentication server can generate all possible authentication replies that it could have produced during a time window (e.g., during the previous 60 second) for the one or more specific unique identifiers. Authentication server 408 can then compare the authentication reply received from information server 404 to the regenerated one or more authentication replies to thereby determine an authentication result. Then, so long as the authentication reply (received from information server 404) was valid during the past 60 seconds, the authentication result is positive.

At a next step 524, the authentication result is sent from authentication server 524 to information server 404. Then at a step 526, in response to receiving the authentication result, information server 404 produces an information reply to the original request of client 406 (sent at step 502). If the authentication result was positive (i.e., successful), then the information reply will contain the information the end user requested. If the authentication result was negative (i.e., unsuccessful), then the information reply would indicate an invalid authentication. Information server 404 then sends the information reply to client 402, at a step 528.

An example of how the present invention can be used is now provided. In this example client 402 is a personal computer and the original request sent at step 502 is a request for access to a bank's online banking web site. The information being requested could be, for example, web page information containing a bank account summary. In this example, the unique identifiers provided by client 402 to servers 404 and 408 include a user's name, an account number, and a PIN. These unique identifiers, along with an authentication request and an encryption key generated at client 402, are sent to authentication server 408, at step 504. Assume that the authentication reply determined at step 506 is a one-time password (OTP). Such a OTP can be generated using any of a number of different algorithms. Exemplary algorithms that can be used to generate OTPs are disclosed in the following patents, each of which is incorporated herein by reference in its entirety: U.S. Pat. No. 4,609,777, entitled "Solid State Key for Controlling Access to Computer Software"; U.S. Pat. No. 4,819,267, entitled "Solid State Key for Controlling Access to Computer Systems"; and U.S. Pat. No. 4,599,489, entitled "Solid State Key for Controlling Access to Computer Software." The are just a few example of algorithms that could be used. The use of alternative algorithms are within the spirit and scope of the present invention.

At step 508, the OTP is encrypted using the encryption key. At step 510, authentication server 408 identifies mobile device 406 to which to send the encrypted OTP, based on the one or more of the unique identifiers it received. Then at step 512, the encrypted OTP is sent to the identified mobile device 406. Assume in this example that the encrypted OTP is then displayed on a display of mobile device 406 at step 514. The end user (to which the mobile phone belongs) can then read the encrypted OTP and enter (e.g., type or key) the encrypted OTP into client 402. Once keyed into client 402, at step 516 client 402 decrypts the OTP using the encryption key (which client 402 had originally generated). Client 402 now has a decrypted OTP that it can use to try to access the account information stored on information server 404. Client 402 can then use the OTP to perform a login sequence.

The login sequence in this example includes sending the OTP and one or more unique identifiers to information server 408, at step 518. Information server 408 now checks to make sure that the end user is who he says he is. Information server 408 accomplishes this by sending the decrypted OTP and one or more unique identifiers to authentication server 408, at step 520. Remember, authentication server 408 originally produced the authentication reply (at step 506), which in this example is a OTP. Authentication server 408 may have saved that OTP along with the one or more unique identifiers. Authentication server 408 can then compare the OTP received from information server 404 to the saved OTP to thereby determine an authentication result (e.g., success or failure) at step 522. If the saved OTP matched the OTP received from the information server (for the specific one or more unique identifiers), then the authentication result would indicate a successful result. Otherwise, the authentication result would indicate a failed result.

Alternatively, rather then saving the OTP (generated at step 506), authentication server 408 can regenerate one or more OTPs (e.g., using the same algorithm used to create the original OTP, where the algorithm relies, for example, on the one or more unique identifiers and a time generated by an internal clock). Then, authentication server 408 can compare the OTP received from information server 404 to the regenerated one or more OTPs to thereby determine an authentication result.

At step 524, authentication server 408 sends the authentication result (e.g., success or failure) to information server 404. In response to receiving the authentication result, information server 404 produces an information reply to the original request (access to the bank's online banking web site) sent by client 402. This information reply is sent to client 402 at step 528. Assuming the authentication result indicated a successful authentication, the information reply may, for example, provide access to a web site, or contain web page data that can be displayed using a browser of client 402. If the authentication result indicated an unsuccessful authentication, then the information reply may specify that account access is denied.

The requests that are sent at steps 102 and 502 can be for any type of information. Other example, which are not meant to be limiting, include a request for access to stored information, a request for an authentication code, a request for an authentication code and a request for a digital signature.

It would be apparent to one of ordinary skill in the relevant art that some of the steps of methods 200 and 500 (discussed with reference to FIGS. 2, 5A and 5B) need not be performed in the exact order described. For example, the order of steps 206 and 208 can be reversed or these steps can be performed simultaneously. However, it would also be apparent to one of ordinary skill in the relevant art that some of the steps should be performed before others. This is because certain steps use the results of other steps. The point is, the order of the steps is only important where a step uses results of another step. Accordingly, one of ordinary skill in the relevant art would appreciate that embodiments of the present invention should not be limited to the exact orders shown in the figures. Additionally, one of ordinary skill in the relevant art would appreciate that embodiments of the present invention can be implemented using subgroups of the steps that are shown in the figures.

Each client (e.g., 102, 402), server (e.g., 104, 404, 408) and mobile device (e.g., 106, 406) discussed above can include a computer/processing system or portions of a computer/processing system. Accordingly, for completeness, the following description of an exemplary computer system 600 is provided with reference to FIG. 6.

Figure 6:
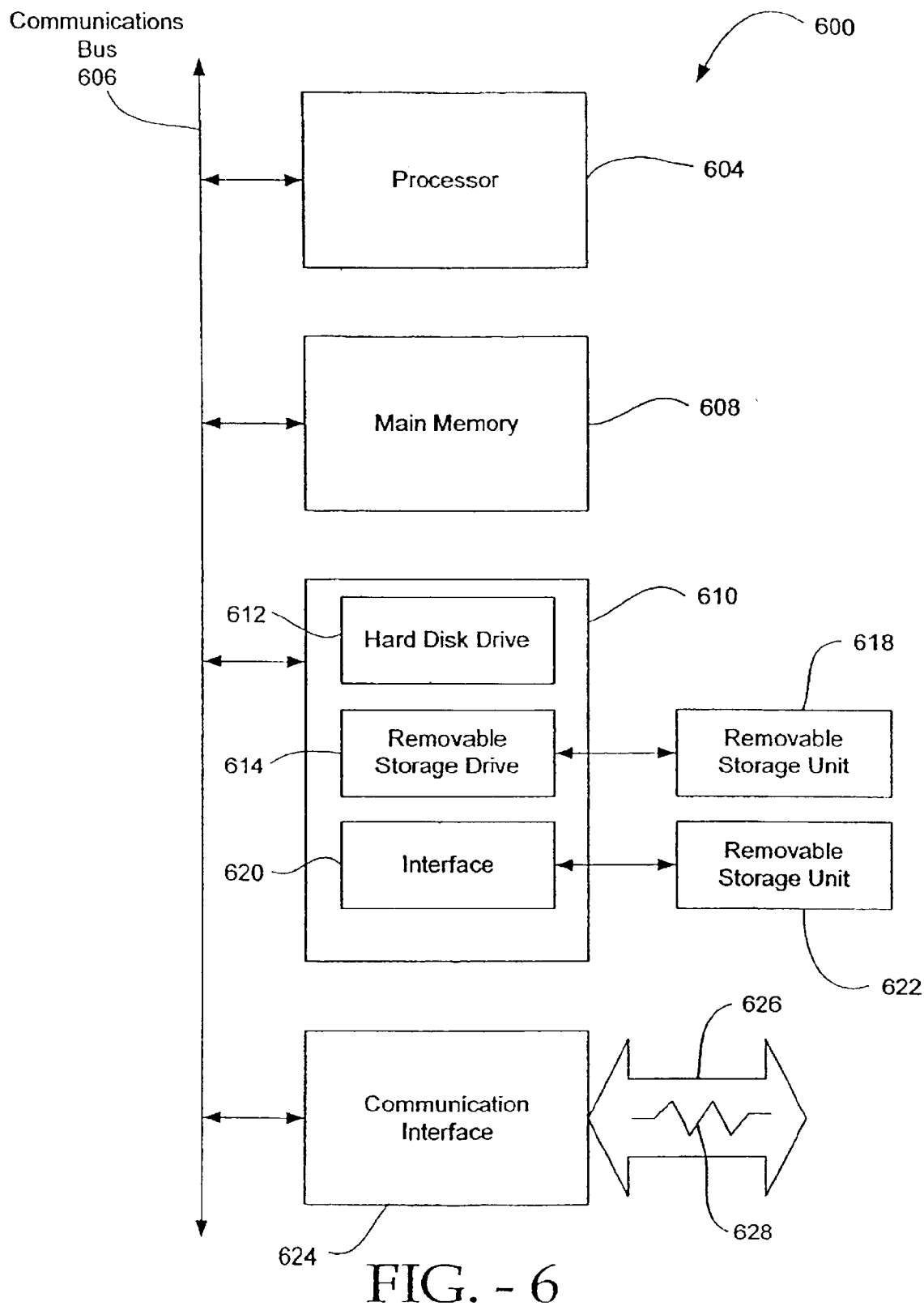
FIG. 6 illustrates an exemplary computer/processing system that can be included within elements of the present invention to perform features of the present invention.

Referring to FIG. 6, example computer/processing system 600 includes one or more processors, such as processor 604. Processor 604 is connected to a communication infrastructure 606 (for example, a bus or network). Various software implementations are described in terms of this exemplary computer system. After reading this description, it will become apparent to a person skilled in the relevant art how to implement the invention using other computer systems and/or computer architectures.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a compact disk drive, a magnetic tape drive, an optical disk drive, etc. The removable storage drive 614 reads from and/or writes to a removable storage unit 618 in a well known manner. Removable storage unit 618, represents a floppy disk, a compact disk, magnetic tape, optical disk, etc. which is read by and written to by removable storage drive 614. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

In this document, the terms "computer program medium" and "computer usable medium" are used to generally refer to media such as removable storage drive 614, a hard disk installed in hard disk drive 612, and signals 628. These computer program products are means for providing software to computer system 600.

Computer programs (also called computer control logic) are stored in main memory 608, secondary memory 610, and/or removable storage units 618, 622. Computer programs may also be received via communications interface 624. Such computer programs, when executed, enable computer system 600 to implement the present invention as discussed herein. In particular, the computer programs, when executed, enable the processor 604 to implement the features of the present invention. Where the invention is implemented using software, the software may be stored in a computer program product and loaded into computer system 600 using removable storage drive 614, hard drive 612 or communications interface 624.

Features of the invention may also be implemented primarily in hardware using, for example, hardware components such as application specific integrated circuits (ASICs). Implementation of the hardware state machine so as to perform the functions described herein will be apparent to persons skilled in the relevant art(s). Features of the present invention can also be implemented primarily using software. In yet another embodiment, features of the invention can be implemented using a combination of both hardware and software.

Assuming servers 104, 404 and/or 408 include a computer system 600, communications interface 624 provides access to communications systems so that messages can be sent and received from client 102 or 402 and sent to mobile device 106 or 406. Main memory 608 and/or secondary memory 610 can be used to store associations between unique identifiers and mobile devices. One or more processors 604 can generate replies to requests, identify a mobile device to which to send the replies, and perform encryption.

Assuming client 102 and/or 402 includes a computer system 600, communications interface 624 provides access to communications systems so that unique identifiers, encryption keys, and requests can be sent to servers 104, 404 or 408. Main memory and/or secondary memory can store encryption algorithms and programs that are executed by the client. One or more processors 604 can generate encryption keys (e.g., based on a stored encryption algorithm), initiate a request for one or more unique identifiers to be entered, and the like. Client 102/402 preferably also includes one or more input mechanisms (not shown), such as but not limited to, a keyboard, keypad, mouse, and/or touch screen. Such an input mechanism enables unique identifiers, requests, and other information to be manually entered by an end user.

Mobile devices 106 and/or 406 may also include a computer system 600. Accordingly, communications interface 624 would provide access to wireless communications systems that would enable the mobile devices to communicate with servers 104, 404, 406 and/or clients 102 or 402. Mobile devices 106 and 406 preferably also include a display (not shown) that enables an encrypted reply and/or other information to be displayed to an end user.

It can be appreciated from the above description that embodiments of the present invention can be used to provide virtually any mobile device with capabilities of a strong authentication token or smart card. An advantage of the present invention is that no modifications of the mobile device are necessary. Thus, every person with an appropriate mobile device (e.g., one with a display), depending on the specific implementation, can receive the security benefits provided by tokens or smart cards without having to purchase or obtain a separate device. Further, the costs of manufacturing and distributing tokens or smart cards are avoided. It is noted that even though the present invention can be used with mobile devices that do not have SIM capabilities, the present invention can be used with such mobile devices.

Embodiments of the present invention can be used for any number of different applications. For example, embodiments of the present invention can be used to provide access-protected Internet services, such as e-banking or e-brokerage. Embodiments of the present invention enable secure user authentication in web servers, firewall systems, remote access systems, as well as access systems in computing centers, by, for example, means of a one-time password.

Embodiments of the present invention can be used, for example, by organizations that have employees and partners who are accessing confidential information from outside the company's protected network. Whether an organization is in the financial, healthcare, government, technology or any other sensitive industry, embodiments of the present invention can be used to make sure only the right people get access to private protected information.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

What is claimed is:

1. A method for secure transmission of information, comprising the steps of:
   (a) sending, from a client to a server, a request, at least one unique identifier and an encryption key;
   (b) generating, at the server, a reply to the request;
   (c) encrypting the reply, at the server, using the encryption key sent from the client to the server, to thereby produce an encrypted reply;
   (d) identifying, at the server, a mobile device to which to send the encrypted reply, based on the at least one unique identifier;
   (e) sending the encrypted reply from the server to the mobile device, wherein the mobile device does not have the encryption key sent from the client to the server; and
   (f) decrypting the encrypted reply, at the client, in response to the encrypted reply being transferred from the mobile device to the client.

2. The method of claim 1, further comprising the following step, between steps (e) and (f):
   sending the encrypted reply from the mobile device to the client.

3. The method of claim 1, further comprising the following step, between steps (e) and (f):
   displaying the encrypted reply on a display of the mobile device.

4. The method of claim 3, wherein the decrypting in step (f) occurs in response to the encrypted reply being manually entered into the client by an end user that has viewed the encrypted reply on the display of the mobile device.

5. The method of claim 1, wherein, following step (f), the reply is available for use by the client.

6. The method of claim 1, further comprising the step of generating the encryption key.

7. The method of claim 1, wherein the request comprises a request for information.

8. The method of claim 1, wherein the request comprises a request for a one-time password.

9. The method of claim 1, wherein the request comprises a request for access to information.

10. The method of claim 1, wherein the request comprises an authentication request.

11. A method for secure transmissions of one-time passwords (OTP) using mobile devices, comprising the steps of:
   (a) sending, from a client to a server, a request for a OTP, at least one unique identifier and an encryption key;
   (b) generating, at the server, the OTP;
   (c) encrypting the OTP, at the server, using the encryption key sent from the client to the server, to thereby produce an encrypted OTP;
   (d) identifying, at the server, a mobile device to which to send the encrypted OTP, based on the at least one unique identifier;
   (e) sending the encrypted OTP from the server to the mobile device, wherein the mobile device does not have the encryption key sent from the client to the server; and
   (f) decrypting the encrypted OTP, at the client, in response to the encrypted reply being transferred from the mobile device to the client.

12. The method of claim 11, further comprising the following step, between steps (c) and (f):
   sending the encrypted OTP from the mobile device to the client.

13. The method of claim 11, further comprising the following step, between steps (e) and (f):
   sending the encrypted OTP from the mobile device to the client.

14. The method of claim 11, further comprising the following step, between steps (e) and (f):
   displaying the encrypted OTP on a display of the mobile device.

15. The method of claim 14, wherein the decrypting in step (f) occurs in response to the encrypted OTP being manually entered into the client by an end user that has viewed the encrypted OTP on the display of the mobile device.

16. The method of claim 11, wherein, following step (f), the OTP is available for use by the client.

17. The method of claim 11, further comprising the step of generating the encryption key.

18. A method for secure transmission of information with a client that has or can generate an encryption key, the method comprising the steps of:
   (a) receiving, from the client, a request, at least one unique identifier and an encryption key;
   (b) generating a reply to the request;
   (c) encrypting the reply using the encryption key that was received from the client, to thereby produce an encrypted reply;
   (d) identifying a mobile device to which to send the encrypted reply, based on the at least one unique identifier; and
   (e) sending the encrypted reply to the mobile device, which does not have the encryption key;
   wherein the encrypted reply, once received by the mobile device, is available for transfer from the mobile device to the client, where the encrypted reply can be decrypted using the encryption key.

19. A subsystem for providing secure transmission of information with a client that has or can generate an encryption key, the subsystem comprising:
   means for generating a reply to a request received from the client;
   means for encrypting the reply using an encryption key received from the client, to thereby produce an encrypted reply; and
   means for identifying a mobile device to which to send the encrypted reply, based on at least one unique identifier received from the client;
   wherein the mobile device does not have the encryption key; and
   wherein the encrypted reply, once received by the mobile device, is available for transfer from the mobile device to the client, where the encrypted reply can be decrypted using the encryption key.

20. The subsystem according to claim 19, further comprising:
   means for receiving, from the client, the request, the at least one unique identifier and the encryption key; and
   means for sending the encrypted reply to the mobile device.

21. A subsystem for providing secure transmission of information with a client that has or can generate an encryption key, the subsystem comprising:
   a receive communications interface to receive a request, at least one unique identifier and an encryption key from the client;
   a processor to
      produce a reply to the request,
      encrypt the reply using an encryption key received from the client, to thereby produce an encrypted reply, and
      identify a mobile device to which to send the encrypted reply, based on the at least one unique identifier; and
   a transmit communications interface to send the encrypted reply to the identified mobile device;
   wherein the identified mobile device does not have the encryption key; and
   wherein the encrypted reply, once received by the identified mobile device, is available for transfer from the mobile device to the client, where the encrypted reply can be decrypted using the encryption key.

22. The subsystem according to claim 21, wherein the receive communications interface and the transmit communications interface comprise the same interface.

23. A system for secure transmission of information, comprising:
   a client;
   a server; and
   a plurality of mobile devices;
   wherein the client is configured to send a request, at least one unique identifier and an encryption key to the server; and
   wherein the server is configured to
      generate a reply to the request,
      encrypt the reply using the encryption key sent from the client, to thereby produce an encrypted reply,
      identify a specific mobile device, of the plurality of mobile devices, to which to send the encrypted reply, and
      send the encrypted reply to the specific mobile device;
   wherein none of the mobile devices have the encryption key;
   wherein the encrypted reply, once received by the specific mobile device, is available for transfer from the specific mobile device to the client; and
   wherein the client is further configured to decrypt the encrypted reply, using the encryption key, once the encrypted reply is transferred from the specific mobile device to the client.

24. The system of claim 23, wherein one or more of the mobile devices includes a display to display an encrypted reply.

25. The system of claim 24, wherein the client includes an input mechanism into which an encrypted reply can be entered, and wherein the client is configured to decrypt the encrypted reply in response to encrypted reply being provided using the input mechanism.

26. The system of claim 23, wherein one or more of the mobile devices includes a means for transmitting a message to the client, the means for transmitting being configured to send the encrypted reply to the client.

27. A method for secure transmission of information, comprising the steps of:
   (a) sending, from a client to an information server, a request for information;
   (b) sending, from the client to an authentication server, an authentication request, at least one unique identifier and an encryption key;
   (c) generating, at the authentication server, an authentication reply;
   (d) encrypting the authentication reply, at the server, using the encryption key sent from the client to the authentication server to thereby produce an encrypted authentication reply;

(e) identifying, at the authentication server, a mobile device to which to send the encrypted authentication reply, based on the at least one unique identifier; and (f) sending the encrypted authentication reply from the authentication server to the mobile device, wherein the mobile device does not have the encryption key sent from the client to the authentication server; and (g) decrypting the encrypted authentication reply, at the client, in response to the encrypted authentication reply being transferred from the mobile device to the client.

28. The method of claim 27, further comprising the steps of:

(h) sending, from the client to the information server, the decrypted authentication reply and the at least one unique identifier;

(i) sending, from the information server to the authentication server, the decrypted authentication reply and the at least one unique identifier;

(j) determining, at the authentication server, an authentication result;

(k) sending, from authentication server to the information server, the authentication result;

(l) producing, at the information server, an information reply to the information request, in response to receiving the authentication result; and (m) sending, from the information server to the client, the information reply.

29. The method of claim 28, further comprising the following step, between steps (f) and (g):

sending the encrypted reply from the mobile device to the client.

30. The method of claim 28, further comprising the following step, between steps (f) and (g):

displaying the encrypted reply on a display of the mobile device.

31. The method of claim 30, wherein the decrypting in step (g) occurs in response to the encrypted reply being manually entered into the client by an end user that has viewed the encrypted reply on the display of the mobile device.

32. The method of claim 27, further comprising the step of generating the encryption key.

33. The method of claim 27, wherein the request for information comprises a request for information stored on the information server.

34. The method of claim 33, wherein the authentication request comprises a request for a one-time password.

35. A system for secure transmission of information, comprising a client;
an information server;
an authentication server; and
a plurality of mobile devices;
wherein the client is configured to
send a request for information to the information server, and
send an authentication request, at least one unique identifier and an encryption key to the authentication server;
wherein the authentication server is configured to
generate an authentication reply to the authentication request,
encrypt the authentication reply using the encryption key received from the client to thereby produce an encrypted authentication reply, identify a specific mobile device, of the plurality of mobile devices, to which to send the encrypted authentication reply, based on the at least one unique identifier, and
send the encrypted authentication reply to the specific mobile device;
wherein none of the mobile devices have the encryption key; and
wherein the client is further configured to decrypt the encrypted authentication reply in response to the encrypted authentication reply being transferred from the mobile device to the client.

36. The system of claim 35, wherein:

the client is further configured to send the decrypted authentication reply and the at least one unique identifier to the information server;

the information server is configured to send the decrypted authentication reply and the at least one unique identifier to the information server;

the authentication server is further configured to determine an authentication result, and to send the authentication result to the information server; and the information server is further configured to produce an information reply to the information request, in response to receiving the authentication result, and to send the information reply to the client.

37. The system of claim 36, wherein the client is further configured to generate the encryption key.

38. The system of claim 36, wherein one or more of the mobile devices includes a display configured to display the encrypted reply.

39. The system of claim 36, wherein one or more of the mobile devices is configured to transmit an encrypted reply to a client.

40. The system according to claim 35, wherein the request for information comprises a request for information stored on the information server.

41. The system according to claim 35, wherein the authentication request comprises a request for a one-time password.

42. A method for secure transmission of information, comprising the steps of:

(a) a client sending a request, at least one unique identifier and an encryption key to a server, where a reply is generated and encrypted using the encryption key to thereby produce an encrypted reply that is sent to a mobile device identifiable based on the at least one unique identifier;

(b) receiving at the client the encrypted reply that was sent, in response to the request, from the server to the mobile device that was identified based on the at least one unique identifier and that does not have the encryption key that was sent to the server; and (c) the client, in response to receiving the encrypted reply that was sent from the server to the mobile device, decrypting the encrypted reply using the encryption key that was sent with the request to the server, thereby producing a decrypted reply.

43. The method of claim 42, further comprising the step of generating the encryption key prior to step (a).

44. The method of claim 42, wherein following step (c) the decrypted reply is available for use.

45. The method of claim 42, wherein step (b) comprises receiving the encrypted reply from the mobile device.

46. The method of claim 42, wherein step (b) comprises accepting a manual entry, of the encrypted reply, from a user viewing the encrypted reply on a display of the mobile device.

47. A computer program product for execution by a server, useful for providing secure transmission of information between the server and a client that has or can generate an encryption key, the computer program product comprising:

computer code to generate a reply to a request received from the client;

computer code to encrypt the reply using an encryption key, received from the client, to thereby produce an encrypted reply; and computer code to identify a mobile device to which to send the encrypted reply, based on at least one unique identifier received from the client;

wherein the identified mobile device does not have the encryption key; and wherein the encrypted reply, once received by the identified mobile device, is available for transfer from the mobile device to the client, where the encrypted reply can be decrypted using the encryption key.

48. A processor readable storage media comprising a processor readable program code embodied on the processor readable storage medium, the processor readable program code for programming a processor to perform a method, the method comprising:

generating a reply to a request received from a client;

encrypting the reply using an encryption key, received from the client, to thereby produce an encrypted reply;

indentifying a mobile device to which to send the encrypted reply, based on at least one unique identifier received from the client; and causing the encrypted reply to be sent to the identified mobile device;

wherein the identified mobile device does not have the encryption key; and wherein the encrypted reply, once received by the identified mobile device, is available for transfer from the mobile device to the client, where the encrypted reply can be decrypted using the encryption key.

* * * * *

UNITED STATES PATENT AND TRADEMARK OFFICE
CERTIFICATE OF CORRECTION

PATENT NO. : 6,880,079 B2
DATED : April 12, 2005
INVENTOR(S) : Mark Gregory Kefford It is certified that error appears in the above-identified patent and that said Letters Patent is hereby corrected as shown below:

Column 14,
Delete lines 60-63.

Column 20,
Line 9, replace "indentifying" with -- identifying --.

Signed and Sealed this

Twenty-eighth Day of June, 2005

JON W. DUDAS
*Director of the United States Patent and Trademark Office*